United States Patent
Mitsui et al.

(10) Patent No.: US 8,203,632 B2
(45) Date of Patent: Jun. 19, 2012

(54) IMAGING APPARATUS

(75) Inventors: Takahiro Mitsui, Osaka (JP); Toshiyuki Miyamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 12/555,976

(22) Filed: Sep. 9, 2009

(65) Prior Publication Data

US 2010/0066873 A1    Mar. 18, 2010

(30) Foreign Application Priority Data

Sep. 9, 2008  (JP) ................. 2008-230797
Sep. 9, 2008  (JP) ................. 2008-230798

(51) Int. Cl.
*H04N 9/64* (2006.01)
(52) U.S. Cl. .................. 348/248; 348/249; 348/345
(58) Field of Classification Search .......... None
See application file for complete search history.

(56) References Cited

U.S. PATENT DOCUMENTS

2005/0219403 A1* 10/2005 Hyodo .......... 348/349

FOREIGN PATENT DOCUMENTS

| JP | 63-157578 | 6/1988 |
| JP | 2004-198699 | 7/2004 |
| JP | 2004198699 A * | 7/2004 |

\* cited by examiner

*Primary Examiner* — Jason Chan
*Assistant Examiner* — Yih-Sien Kao
(74) *Attorney, Agent, or Firm* — Wenderoth, Lind & Ponack, L.L.P.

(57) ABSTRACT

An imaging apparatus includes an imaging device operable to convert an optical image input through a focus lens for adjusting focus into electric signals in each of RGB colors, a luminance signal generator operable to generate a luminance signal based on the electric signal output from the imaging device, a low-frequency filter for transmitting low-frequency components of the luminance signal output, which has a frequency lower than a predetermined frequency, a high-frequency filter for transmitting high-frequency components of the luminance signal output, which has a frequency higher than a predetermined frequency, and a processor. The processor determines if focusing is influenced by a subject with high luminance. If determining that focusing is influenced, the unit detects a focal point based on high-frequency components. If determining that focusing is not influenced, the unit detects a focal point based on low-frequency components and then based on high-frequency components.

5 Claims, 8 Drawing Sheets

IMAGING APPARATUS

BACKGROUND ART

1. Technical Field

The present invention relates to an imaging apparatus for carrying out automatic focus (hereinafter referred to as "AF") control.

2. Related Art

Figure 7:
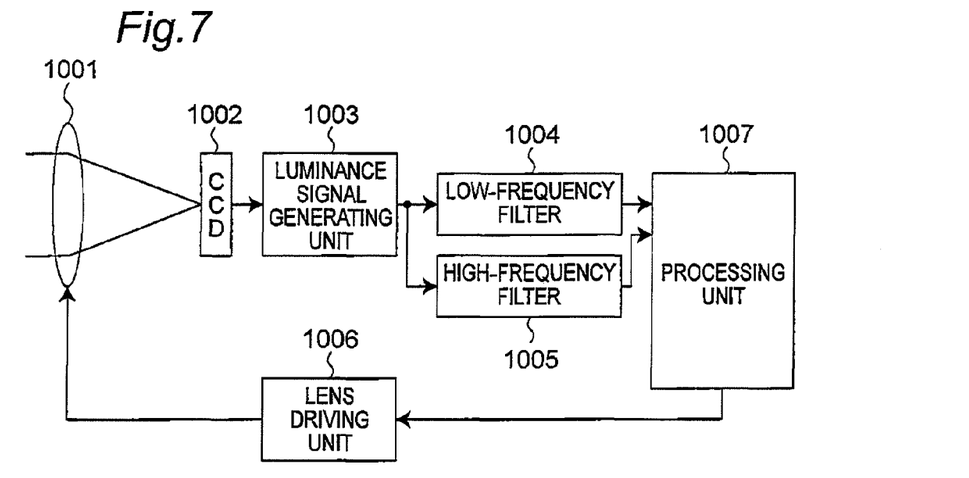
FIG. 7 is a block diagram showing the configuration of a conventional video camera.

AF control techniques of conventional imaging apparatuses are proposed in, for example, JP-A-63-157578 and JP-A-2004-198699. JP-A-63-157578 discloses an AF control technique based on a so-called hill-climbing method, which using frequency components of a subject to perform AF control. FIG. 7 is a block diagram showing the configuration of an imaging apparatus using the AF control technique disclosed in JP-A-2004-198699.

This imaging apparatus includes a focus lens 1001, a CCD 1002, a luminance signal generating unit 1003, a low-frequency filter 1004, a high-frequency filter 1005, a lens driving unit 1006, and a processing unit 1007. The focus lens 1001 adjusts the focus. The CCD 1002 converts an optical image input through the focus lens 1001 into electric signals in each color of RGB. The luminance signal generating unit 1003 generates a luminance signal using an electric signal (video signal) output from the CCD. The low-frequency filter 1004 passes low-frequency components of the luminance signal output from the luminance signal generating unit 1003, each of which has a frequency not higher than a predetermined frequency. The high-frequency filter 1005 passes high-frequency components of the luminance signal output from the luminance signal generating unit 1003, each of which has a frequency not lower than a predetermined frequency. Upon AF operations, output data of these filters are used as AF evaluation data.

The lens driving unit 1006 drives the focus lens 1001 along an optical axis direction. The processing unit 1007 controls the lens driving unit based on the AF evaluation data to thereby control the AF operation. The processing unit 1007 includes a microcomputer and the like. The processing unit 1007 controls the lens driving unit 1006 based on AF evaluation data generated by the low-frequency filter 1004 and then controls the lens driving unit 1006 based on AF evaluation data generated by the high-frequency filter 1005 to thereby control the AF operation.

Figure 8:
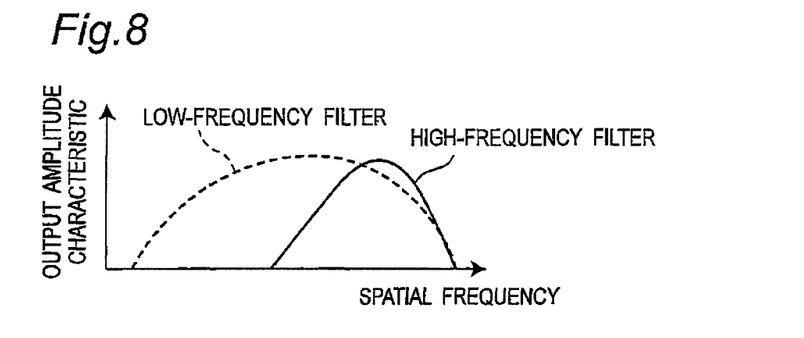
FIG. 8 is a characteristic diagram showing spatial frequency characteristics of output amplitude characteristics of a low-frequency filter and high-frequency filter.

Referring to FIG. 8, characteristics of the low-frequency filter 1004 and the high-frequency filter 1005 are described. In FIG. 8, the horizontal axis represents a frequency band, and the vertical axis represents output characteristics of a filter. As will be apparent from FIG. 8, the low-frequency filter 1004 passes only low-frequency components of a luminance signal while the high-frequency filter 1005 passes only high-frequency components of the luminance signal.

Figure 9:
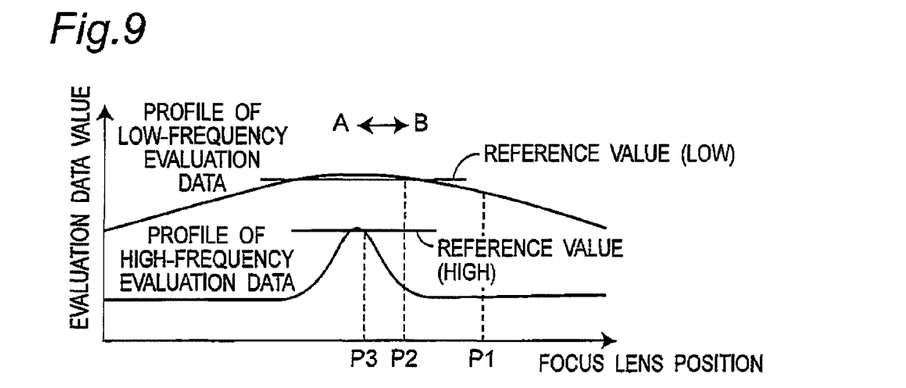
FIG. 9 is a schematic diagram of low-frequency evaluation data and high-frequency evaluation data in the case where a subject with high luminance is positioned in a taken image.

A luminance signal passing through the low-frequency filter 1004 or the high-frequency filter 1005 is changed in accordance with a position of the focus lens. The AF evaluation data has the profile as shown in FIG. 9. FIG. 9 is a schematic diagram showing profiles of high-frequency AF evaluation data and low-frequency AF evaluation data of a signal passed through the low-frequency filter 1004 and the high-frequency filter 1005 in capturing an image with general brightness. A horizontal axis shows a position of the focus lens, a vertical axis shows intensity of each of evaluation data. As will be apparent from FIG. 9, the profile of the low-frequency evaluation data slowly curves like a mountain such that the data shows the highest intensity at the focus position. The profile of the high-frequency evaluation data is such that the data shows the highest intensity at the focus position and the profile sharply curves like a mountain at only around the focus position and is almost flat in the other positions.

According to the thus-configured video camera, an optical image input through the focus lens 1001 is converted into an electric signal with the CCD 1002, and a luminance signal is generated by the luminance signal generating unit 1003, then, based on the generated signal, the low-frequency filter 1004 and the high-frequency filter 1005 generate AF evaluation data. The processing unit 1007 compares previous AF evaluation data (previous CCD driving period) and current AF evaluation data. If the processing unit detects a change, the unit determines that an image being captured is changed and then starts AF operations.

During the AF operations, the processing unit 1007 moves the focus lens 1001 in the direction in which low-frequency evaluation data generated by the low-frequency filter 1004 increases (for example, toward the A direction if a current position is P1 in FIG. 9) with a predetermined period to determine whether the data is larger than a reference value for determining that the focus lens 1001 reaches a focal point or its vicinity. If the data is smaller than the reference value, the focus lens 1001 is determined to be out of the focal point or its vicinity and then moved further. If the low-frequency evaluation data is not larger than the reference value even after the focus lens 1001 is repeatedly moved for a predetermined time, it is determined that the lens cannot come into focus, and the AF operation is stopped. On the other hand, if the data is the reference value or larger, it is determined that the lens reaches the focal point or its vicinity (P2), and the processing unit shifts to AF control using high-frequency evaluation data.

The processing unit 1007 controls the lens driving unit 1006 based on high-frequency evaluation data generated by the high-frequency filter 1005 and moves the focus lens 1001 in the optical axis direction (for example, toward the A direction if a current position is P2 in FIG. 9). After the lens driving unit 1006 has been moved, if the high-frequency evaluation data becomes the reference value or larger (for example, at the position P3 in FIG. 9), the focus lens 1001 is determined to come into focus and the AF operation is stopped. If the high-frequency evaluation data is not larger than the reference value, it is determined that the focus lens 1001 does not come into focus, and further moves the focus lens 1001. If the high-frequency evaluation data is not larger than the reference value, even after the focus lens 1001 is repeatedly moved for a predetermined time, it is determined that the lens cannot come into focus, and the AF operation is stopped.

According to such AF operations, even if the focus lens 1001 is somewhat away from the focal point, the AF operation can start rapidly because the inclination of the profile of the low-frequency evaluation data is large. Finally, auto-focusing operation is performed based on the high-frequency evaluation data, and thus the lens can reach the focal point speedily and accurately.

However, the above conventional configuration is effective for capturing an image with general brightness, but if a subject with high luminance is positioned in a taken image, there arises a problem that it is difficult to focus on a subject as a focusing object.

SUMMARY

In view of the above problem, it is an object of the present invention to provide an imaging apparatus with AF control that can focus on a target subject in a satisfactory manner.

The inventors of the subject application have found that the above problem that the lens cannot focus on a portion other than a subject with high luminance if the subject with high luminance is positioned in a taken image occurs for at least two following reasons.

(1) Reason 1

Figure 10:
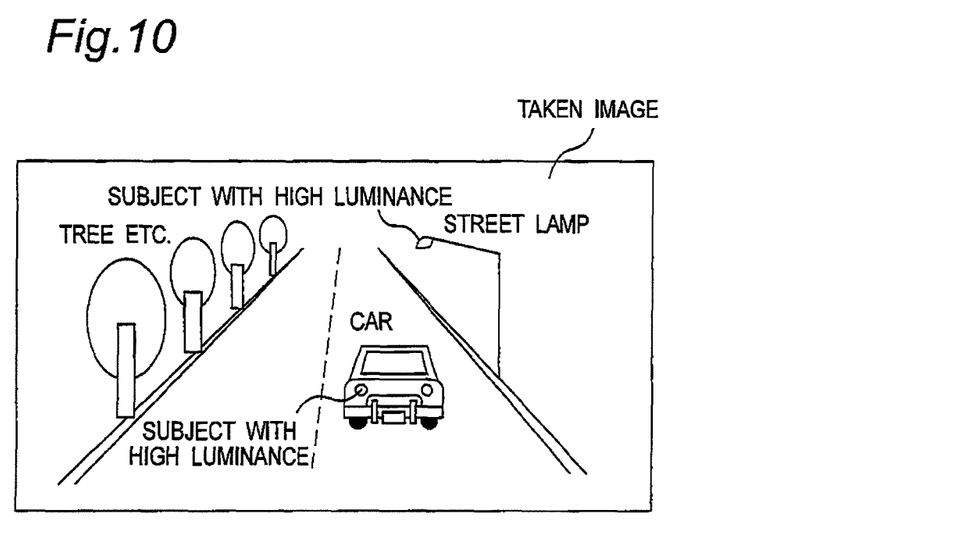
FIG. 10 shows an example of an image including a subject with high luminance.
Figure 11:
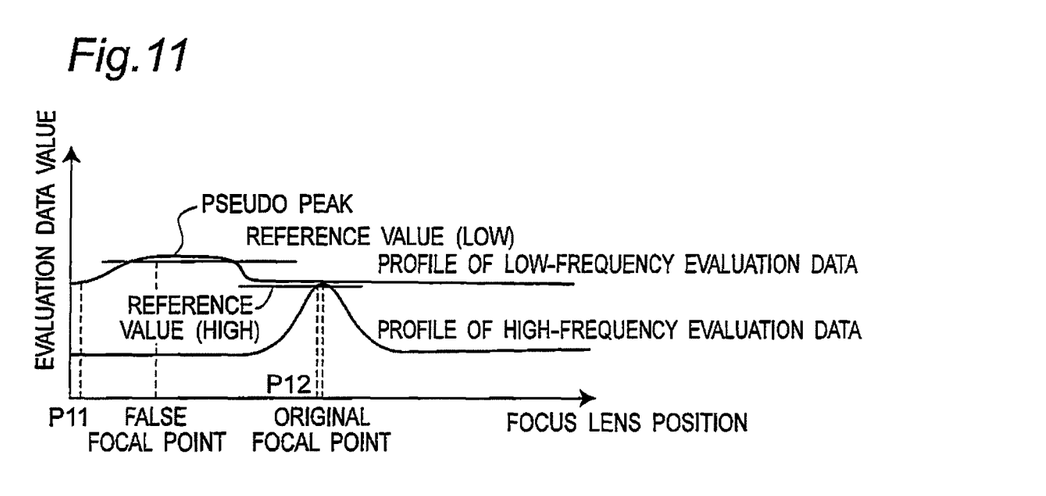
FIG. 11 is a schematic diagram of low-frequency evaluation data and high-frequency evaluation data.

As shown in FIG. 10, if a subject with high luminance such as an automotive light, a halogen lamp or other such light sources is positioned in a taken image, the image is captured by a video camera with the iris being closed. As a result, a subject other than the subject with high luminance is dark and obscure, and as shown in FIG. 11, low-frequency evaluation data is totally low and the profile of its value is flat. In addition, if the subject with high luminance is blurred, an area of the light source is blurred and increased, as a result, a pseudo peak that is gradually elevated appears in an evaluation data value of a low-frequency filter. In such a case, according to conventional techniques, the apparatus shifts to adjust the focus to a false focal point, not a correct focal point, based on high-frequency evaluation data. However, low-frequency evaluation data becomes lower than a reference value at a position away from the pseudo peak during the adjustment, thus, the apparatus shifts to adjust the focus of the lens based on the low-frequency evaluation data again. In the end, the lens cannot come into focus.

(2) Reason 2

In detecting a subject with high luminance in a taken image based on a luminance signal according to the related art, there may be a case difficult to detect up to color of the subject with luminance. In other words, a luminance signal Y is calculated using R, G, and B primary colors based on the following formula:

$$Y = 0.299 \times R 0.587 \times G + 0.114 \times B$$

As will be understood from the formula, the G color accounts for about 60% of the total degree of contribution to the luminance signal, while the R color accounts for about 30% and the B color accounts for only 10%. Therefore, if a subject with high luminance is an image with high intensity of, for example, R color or B color, the luminance signal takes a low value thereto. As a result, the apparatus will never shift to focus control based on the high-frequency evaluation data, and in the end, the lens cannot come into focus in some cases. In other words, the method for detecting a subject with high luminance in a taken image using a luminance signal has a problem that there may be a case difficult to detect up to color of the subject with luminance, as a result the optimum focus control is impossible.

To solve the above problems, an imaging apparatus includes: a focus lens for adjusting focus; an imaging device operable to convert an optical image input through the focus lens into electric signals in each of RGB colors; a luminance signal generator operable to generate a luminance signal based on the electric signal output from the imaging device; a low-frequency filter operable to weaken signal components of the luminance signal output from the luminance signal generator, each of which has a frequency equal to or higher than a predetermined frequency; a high-frequency filter operable to weaken signal components of the luminance signal output from the luminance signal generator, each of which has a frequency equal to or lower than a predetermined frequency; a determiner operable to determine whether focusing is influenced by a subject with high luminance based on a signal level of each of RGB colors; and a processor operable to detect a focal point based on an output of the high-frequency filter when the determiner determines that focusing is influenced by the subject with high luminance, and to detect a focal point based on an output of the low-frequency filter and then detect a focal point based on an output of the high-frequency filter when the determiner determines that focusing is not influenced by the subject with high luminance.

According to the above embodiment, an influence of a subject with high luminance is determined based on a signal level of each color of RGB. If an influence thereof is detected, a focal point is detected based on high-frequency components. On the other hand, if no influence is detected, a focal point is detected based on low-frequency components and then a focal point is detected based on the high-frequency components. That is, the optimum AF evaluation data for an image including a subject with high luminance can be selected and the lens can come into focus.

Particularly, according to the embodiment, an influence of a subject with high luminance is determined based on a level of each of R, G, and B signals. At this time, an appropriate threshold value conceivable for each of R, G, and B colors is set in accordance with a subject with high luminance. Hence, the focus lens can come into focus accurately, irrespective of a color of the subject with high luminance.

DETAIL DESCRIPTION OF THE PREFERRED EMBODIMENTS

Hereinafter, embodiments will be described with reference to the accompanying drawings.

First Embodiment

1. Configuration

Figure 1:
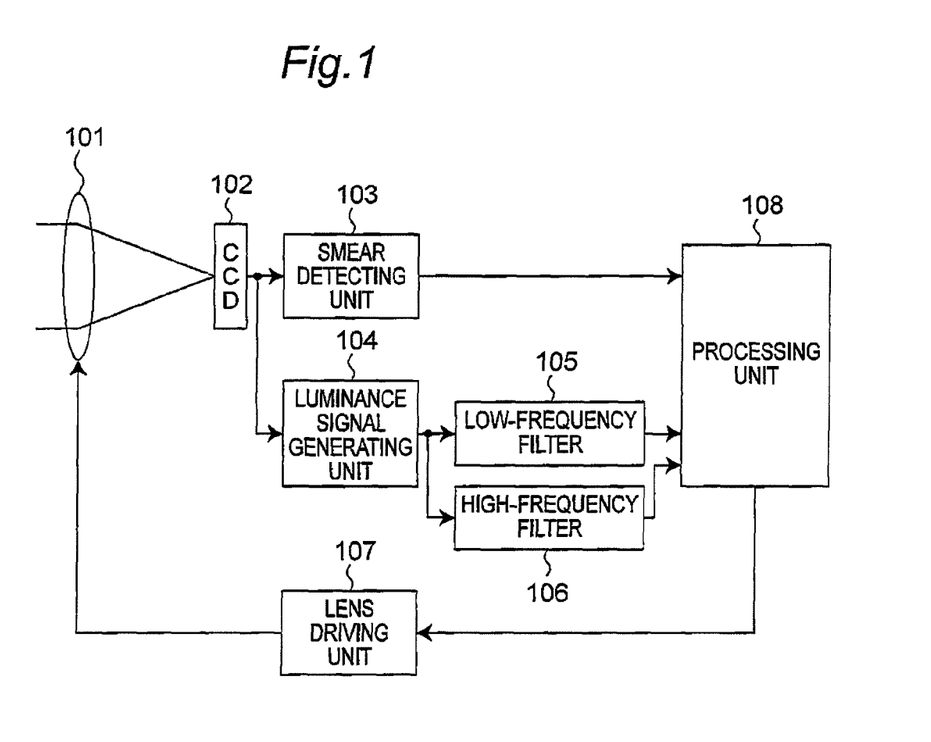
FIG. 1 is a block diagram of an imaging apparatus according to a first embodiment.

FIG. 1 is a block diagram showing the configuration of a video camera according to a first embodiment. As shown in FIG. 1, an imaging apparatus includes a focus lens 101, a CCD 102, a smear detecting unit 103, a luminance signal generating unit 104, a low-frequency filter 105, a high-frequency filter 106, a lens driving unit 107, and a processing unit 108. The focus lens 101 adjusts the focus. The CCD 102 converts an input optical image into electric signals. The smear detecting unit 103 detects an occurrence of smear in an image based on an electric signal output from the CCD. The luminance signal generating unit 104 generates a luminance signal using an electric signal (video signal) output from the CCD. The low-frequency filter 105 passes low-frequency components of the luminance signal output from the luminance signal generating unit 104, each of which has a frequency not higher than a predetermined frequency. The high-frequency filter 106 passes high-frequency components of the luminance signal output from the luminance signal generating unit 104, each of which has a frequency not lower than a predetermined frequency. The lens driving unit 107 drives the focus lens 101 along an optical axis direction. The processing unit 108 controls the lens driving unit 107 based on the AF evaluation data to thereby control the AF operation.

2. Operation

Figure 2:
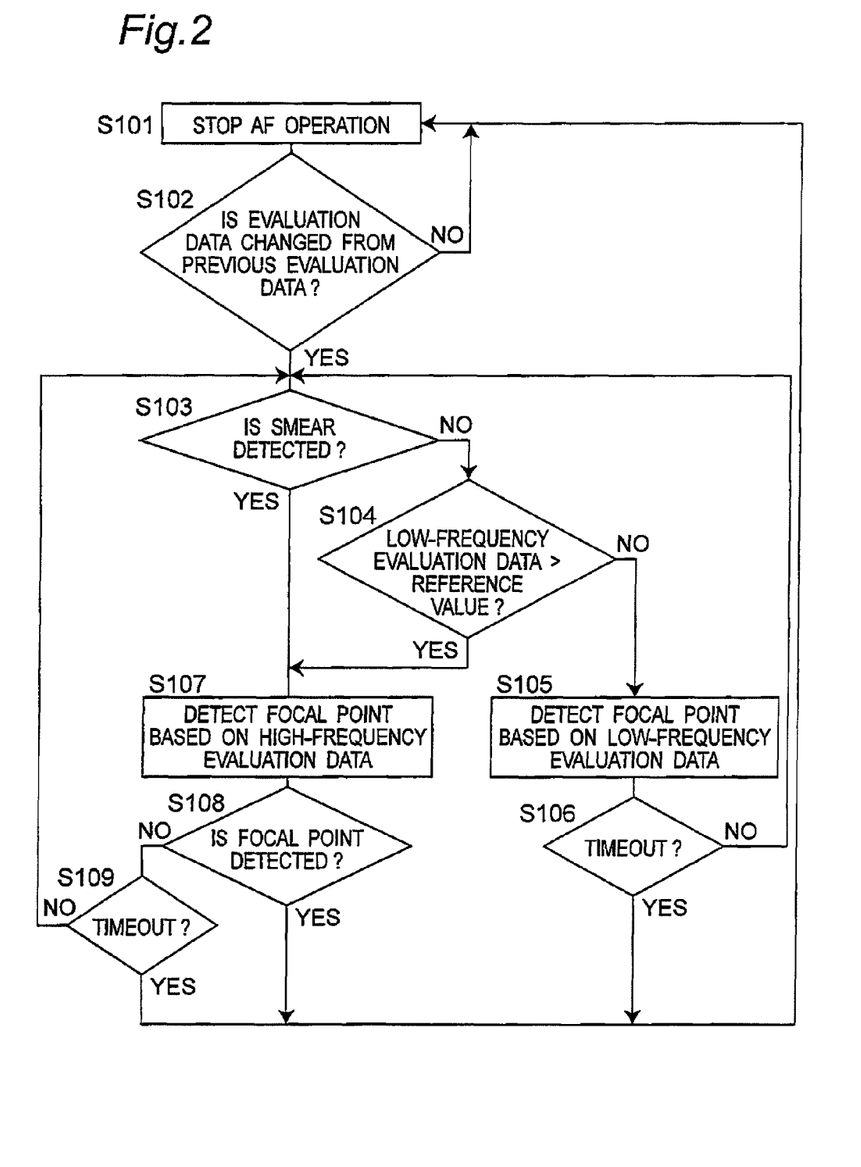
FIG. 2 is a flowchart of operations of the first embodiment.

Referring to FIGS. 1 and 2, operations of the thus-configured video camera are described. Here, an AF stop state (S101) is set to an initial state, for the convenience of explanation.

To begin with, an operation up to the start of AF operation is described. This operation is performed with a driving period (for example, ⅟60 seconds) of the CCD 102.

In the state in which the AF operation stops (S101), the CCD 102 converts an optical image input therein through the focus lens 101 into an electric signal, and based on the electric signal, the luminance signal generating unit 104 generates a luminance signal. The low-frequency filter 105 and the high-frequency filter 106 generate AF evaluation data on the basis of the luminance signal. The processing unit 108 compares previous AF evaluation data (previous CCD driving period) with current AF evaluation data. If the change is detected, the processing unit 108 determines that an image being captured is changed and starts AF operations (YES in S102).

After the AF operations started, the processing unit 108 determines whether smear is detected based on a detection result of the smear detecting unit 103 (S103).

Here, the smear, how the smear occurs, and the like are described.

(1) Definition of Smear

The smear is a phenomenon unique to CCD imaging devices, showing up as a vertical streak in an image if strong light enters.

(2) Operation of CCD

The CCD includes a photoelectric conversion device (photodiode) operable to convert light into charges, a vertical transfer CCD for transferring the charges in the vertical direction, and a horizontal transfer CCD for transferring the charges in the horizontal direction. Charges accumulated through the photoelectric conversion in the photodiode are read to the vertical transfer CCD. The vertical transfer CCD transfers charges corresponding to one line to the horizontal transfer CCD, and the horizontal transfer CCD transfers and outputs charges corresponding to one line in the vertical direction. The vertical transfer and horizontal transfer are repeated until charges of all lines are output. During a period in which the vertical transfer and horizontal transfer are repeated, the photodiode accumulates charges again through photoelectric conversion. After all charges have been transferred in the previous process, the accumulated charges are read to the vertical transfer CCD again.

(3) Process of Occurrence of Smear

If strong light enters, charges excessively accumulated in the photodiode move beyond a potential barrier between the photodiode and the vertical transfer CCD. The moved charges flow into the vertical transfer CCD. Then, a bright streak appears in a vertical direction on an image. The bright vertical streak is smear. For example, in the case of capturing an image of a strong point light source, a vertical streak appears, extending upwards and downwards from the point light source.

(4) Specific Example of Smear Detection

Next, a method for detecting smear with the smear detecting unit 103 is described. The CCD includes an effective pixel region for photoelectrically converting a captured image, and an OB (optical black) region including light-shielded pixels (OB pixels) for outputting a reference level (black level). The OB region surrounds the effective pixel region. If smear appears, charges leak to the vertical transfer CCD, and an output level of the OB pixel that is originally used to output a black level becomes very high. Thus, the occurrence of smear can be detected by monitoring an output level of the OB pixel.

According to this embodiment, the smear detecting unit 103 detects an electric signal level of the OB pixel for each of R, G, and B (red, green, and blue) colors. If an electric signal level of an OB pixel in at least one color is at a predetermined level or more, it is determined that smear occurs. The above method for detecting smear is described by way of example, and the other detecting methods are, of course, applicable.

A predetermined level used for detecting smear may be set independently for each of RGB colors. Further, the predetermined level may be changed as in the following example in accordance with a taken image.

EXAMPLE 1

RGB components of lamp used for monitoring traffic in the night vary depending on types of the lamps. Upon high-luminance determination with a general luminance signal (Y), an apparatus is sensitive to a head lamp but is less sensitive to a brake lamp. Thus, a threshold value of only an R component is set lower than threshold values of a G component and B component, making it easy to detect a brake lamp with a high ratio of R components. In other words, the head lamp and the brake lamp can be both detected in a balanced manner by setting only a threshold value of R components at a low level.

EXAMPLE 2

As for fireworks and so on, there are various types of colors such as all blue color and all green color, and thus the same threshold value is set for each of R, G, and B components. As a result, an insensitive color of a general luminance signal such as blue can be detected.

The description returns to step S103 and subsequent steps in the flowchart in FIG. 2. If smear is not detected in step S103, that is, if it is determined that a subject with high luminance does not influence focusing, the processing unit 108 determines whether a value of low-frequency evaluation data generated by the low-frequency filter 105 is not smaller than a reference value for determining that the focus lens 101 reaches a focal point or its vicinity (S104). If the value is not smaller than the reference value, it is determined that the focus lens 101 reaches a focal point or its vicinity, and AF operations start based on high-frequency evaluation data (S107). If the value is not larger than the reference value, it is determined that the focus lens 101 does not reach a focal point or its vicinity and is further moved (S105). If the evaluation data becomes the reference value or less even after the operation in step S105 is repeated for a predetermined time, it is determined that the lens cannot come into focus (YES in S106), and the AF operations stop (S101).

If smear is detected in step S103, that is, if it is determined that focusing is influenced by a subject with high luminance, or if the low-frequency evaluation data is not smaller than the reference value in step S104 and it is determined that the focus lens reaches a focal point or its vicinity, the processing unit 108 does not perform AF operations based on the low-frequency evaluation data. In this case, the processing unit 108 immediately controls the lens driving unit 107 based on the high-frequency evaluation data generated by the high-frequency filter 106 to move the focus lens 101 along the optical axis direction (S107). If the high-frequency evaluation data is not smaller than the reference value at a position of the moved focus lens, the processing unit 108 determines that the lens comes into focus (YES in S108) and stops the AF operations (S101). On the other hand, if the high-frequency evaluation data is not larger than the reference value, the processing unit 108 determines that the lens is out of focus (NO in S108) and shifts to step S109. If the high-frequency evaluation data becomes the reference value or less (YES in S109) even after the above processing is repeated for a predetermined time, the processing unit 108 determines that the lens cannot come into focus and stops the AF operations (S101).

As described above, even if smear is detected during adjustment of the focus through the AF operation based on the low-frequency evaluation data, the processing unit 108 immediately performs the AF operations based on the high-frequency evaluation data (S107).

Referring back to FIG. 11, the above operation is described next in detail. The focus lens position at the start of AF operation is set as P11. The CCD 102 converts an optical image in the focus lens position P11 into an electric signal. The luminance signal generating unit 104 generates a luminance signal. The low-frequency filter 105 generates low-frequency evaluation data. The high-frequency filter 105 generates high-frequency evaluation data. In FIG. 11, a pseudo peak appears in the low-frequency evaluation data due to an influence of smear. In such a case, the smear detecting unit 103 detects the smear. As a result, the AF control is carried out utilizing the high-frequency evaluation data, not the low-frequency evaluation data. In other words, the processing unit 108 moves the focus lens 101 in the direction in which the high-frequency evaluation data increases (in FIG. 11, to the right) while monitoring an increase/decrease of the high-frequency evaluation data. After that, if the high-frequency evaluation data exceeds the reference value, the processing unit 108 stops moving the focus lens 101. As a result, the focus lens 101 is positioned in the originally-set focal point or its vicinity (P12 in FIG. 11) and brought into focus. That is, the problem of the false focal point, which arises in the case of using the low-frequency evaluation data, can be avoided.

3. Summary

As described above, according to this embodiment, if smear is detected in a taken image, AF operations are forcedly performed based on the high-frequency evaluation data, not performed AF operations based on the low-frequency evaluation data. Thus, even in the case where a false focal point could be detected by AF control using the low-frequency evaluation data due to a subject with high luminance that might cause smear in a taken image, a correct focal point can be detected and the focus lens can be moved to the correct position. Particularly, since smear is detected in each of RGB colors, a smear detection result does not vary depending on a color of a subject. As a result, the lens can reach a focal point accurately and surely, independent of a color of a subject with high luminance. Further, if a taken image includes no subject with high luminance that might cause smear, the lens can reach a focal point quickly and accurately as in the conventional configuration.

Second Embodiment

Hereinafter, a second embodiment will be described with reference to FIGS. 3 and 4.

1. Configuration

Figure 3:
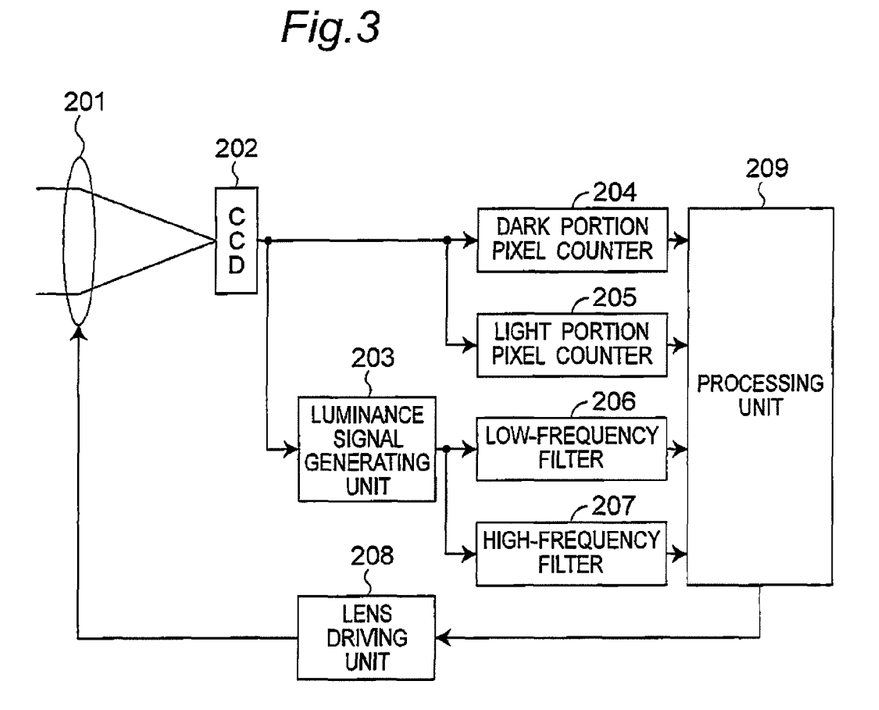
FIG. 3 is a block diagram of an imaging apparatus according to a second embodiment.

As shown in FIG. 3, an imaging apparatus includes a focus lens 201, a CCD 202, a luminance signal generating unit 203, a dark portion pixel counter 204, a light portion pixel counter 205, a low-frequency filter 206, a high-frequency filter 207, a lens driving unit 208, and a processing unit 209. The focus lens 201 adjusts the focus. The CCD 202 converts an input optical image into electric signals. The luminance signal generating unit 203 generates a luminance signal using an electric signal (video signal) output from the CCD 202. The dark portion pixel counter 204 counts the pixels in a dark portion based on an electric signal output from the CCD 202. The light portion pixel counter 205 counts the pixels in a light portion based on an electric signal output from the CCD 202. The low-frequency filter 206 passes low-frequency components of the luminance signal output from the luminance signal generating unit 203, each of which has a frequency not higher than a predetermined frequency. The low-frequency filter 206 generates low-frequency evaluation data based on the luminance signal output from the luminance signal generating unit 203. The high-frequency filter 207 passes high-frequency components of the luminance signal output from the luminance signal generating unit 203, each of which has a frequency not lower than a predetermined frequency. The high-frequency filter 206 generates high-frequency evaluation data based on the luminance signal output from the luminance signal generating unit 203. The lens driving unit 208 drives a focus lens 201 along an optical axis direction. The processing unit 209 calculates a ratio between the number of pixels in a light portion and the number of pixels in a dark portion in all RGB colors (a ratio of the number of pixels in a light portion to the number of pixels in a dark portion), and compares the ratio with a predetermined value to control the lens driving unit 208 based on the comparison result utilizing low-frequency evaluation data or high-frequency evaluation data to thereby control the AF operation.

Here, the dark portion pixel counter 204 and the light portion pixel counter 205 are provided for each of primary color electric signals R, G, and B output from the CCD 202. The dark portion pixel counter 204 counts the pixels of which signal levels are at a predetermined level or less in each of RGB colors of an electric signal output from the CCD 202 to obtain the number of pixels in a dark portion. The light portion pixel counter 205 counts the pixels of which signal levels are at a predetermined level or more (larger than the predetermined level for the dark portion) in each of RGB colors of an electric signal output from the CCD 202 to obtain the number of pixels in a light portion.

Here, the predetermined level of the signal level in the light portion pixel counter 205 and the predetermined level of the signal level in the dark portion pixel counter 204 may be arbitrarily set in accordance with conceivable brightness or color of a subject with high luminance for each of RGB colors. Further, a predetermined value for the ratio between the number of pixels in a light portion and the number of pixels in a dark portion (a ratio of the number of pixels in a light portion to the number of pixels in a dark portion) may be arbitrarily set for each of RGB colors.

2. Operation

Figure 4:
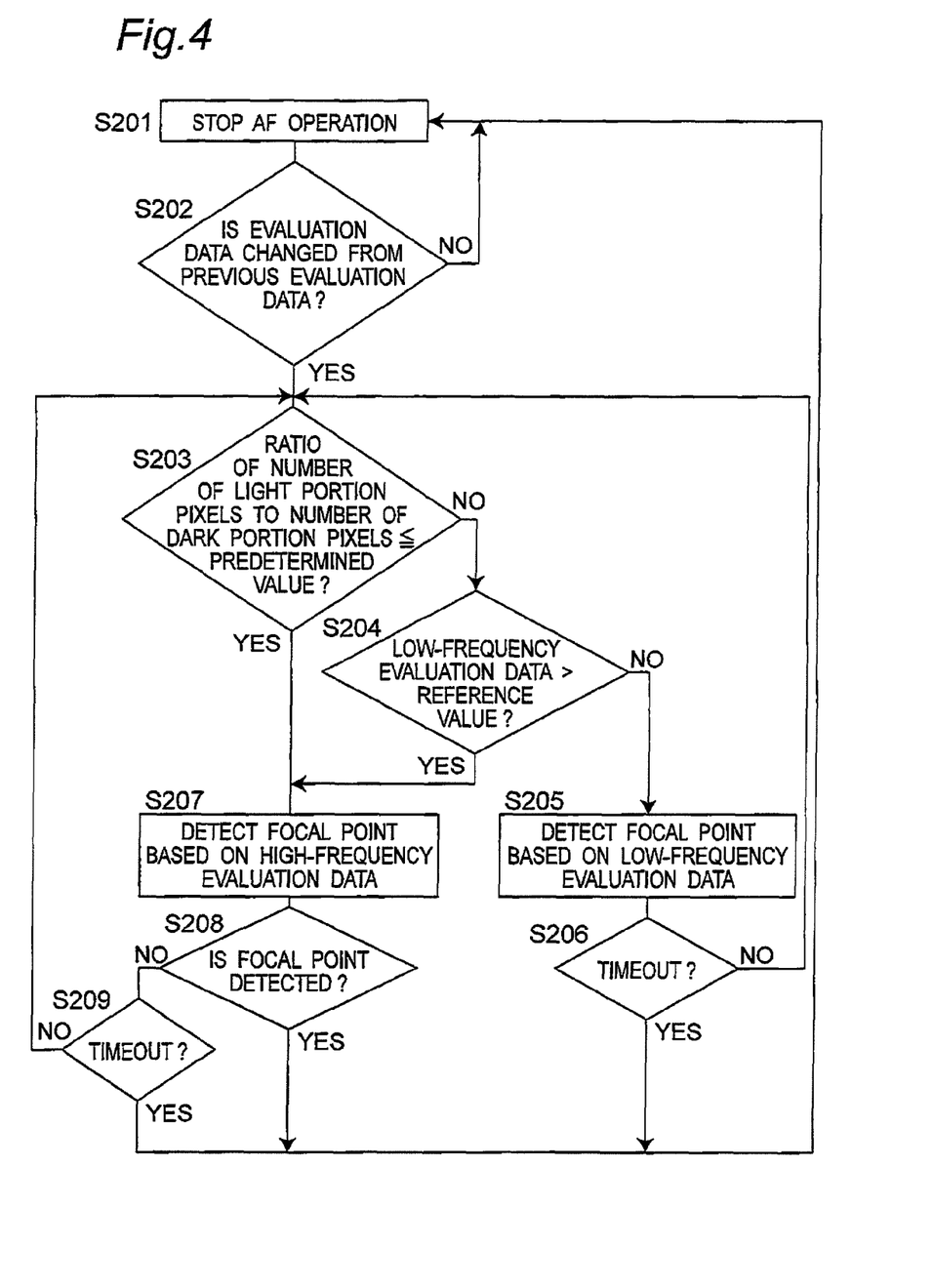
FIG. 4 is a flowchart of operations of the second embodiment.

Referring to FIG. 4, operations of the imaging apparatus are described. Here, similar operations to the first embodiment are omitted. The CCD 202 converts an optical image input through the focus lens 201 into electric signals for each of RGB pixels. The dark portion pixel counter 204 and the light portion pixel counter 205 counts the pixels in a dark portion and light portion for each of RGB colors out of the pixels of a taken image. The luminance signal generating unit 203 generates a luminance signal. The low-frequency filter 206 and the high-frequency filter 207 generate AF evaluation data based on the luminance signal. The processing unit 209 compares previous evaluation data (previous imaging device driving period) with current evaluation data. If any change is detected, processing unit 209 determines that an image being captured is changed and start AF operations (S202).

If the AF operations start, the processing unit 209 refers the count results from the dark portion pixel counter 204 and the light portion pixel counter 205. As a result, if the ratio between the number of pixels in a light portion and the number of pixels in a dark portion in all RGB colors (a ratio of the number of pixels in a light portion to the number of pixels in a dark portion) is larger than a predetermined value (NO in S203), it is determined that a taken image is an image with general brightness and there is no influence of a subject with high luminance on focusing. Then, similarly to the conventional techniques, the AF operations are performed based on low-frequency evaluation data (S205), and afterward then the AF operations are performed based on the high-frequency evaluation data (S207).

On the other hand, if the ratio between the number of pixels in a light portion and the number of pixels in a dark portion in at least one of RGB colors (a ratio of the number of pixels in a light portion to the number of pixels in a dark portion) is not larger than a predetermined value (YES in S203), it is determined that a taken image is a dark image with a subject with high luminance, that is, the subject with high luminance influences focusing. Then, AF operations are immediately performed based on the high-frequency evaluation data instead of performed AF operations (S207) based on the low-frequency evaluation data.

As described above, if it is detected that the ratio between the number of pixels in a light portion and the number of pixels in a dark portion in at least one of RGB colors (a ratio of the number of pixels in a light portion to the number of pixels in a dark portion) is not larger than a predetermined value during the adjustment of focus through the AF operation with the low-frequency evaluation data (S205), AF operations are immediately performed based on the high-frequency evaluation data (S207).

More specifically, the processing unit 209 controls the lens driving unit 208 based on the high-frequency evaluation data generated by the high-frequency filter 207 and moves the focus lens 201 in an optical axis direction (S207). If the resultant high-frequency evaluation data obtained through the movement is the reference value or more, the processing unit 209 determines that the lens comes into focus (YES in S208) and stops AF operations (S201). On the other hand, if the evaluation data is the reference value or less, the processing unit 209 determines that the lens is out of focus (NO in S208) and further moves the focus lens 201 (S207). If the evaluation data becomes the reference value or less even after the operation in step S207 is repeated for a predetermined time, the processing unit 209 determines that the lens cannot come into focus (YES in step S209) and stops the AF operations.

As described above, according to the present invention, if it is determined that the ratio between the number of pixels in a light portion and the number of pixels in a dark portion to ratio of the number of pixels in a light portion to the number of pixels in a dark portion) is a predetermined value or less, AF operations are performed only based on the high-frequency evaluation data without performed AF operations based on the low-frequency evaluation data. As a result, in the case of capturing a dark image including a subject with high luminance, such a problem that a false focal point is detected through the AF operations based on low-frequency evaluation data can be avoided. That is, a correct focal point can be detected, and the focus lens can be moved to a correct position. Further, in the case of capturing an image with general brightness, as in the conventional configuration, the lens can reach a focal point quickly and accurately. Particularly, in this embodiment, since the ratio between the number of pixels in a light portion and the number of pixels in a dark portion is calculated in each of RGB colors of a taken image and determined, the count result does not depend on a color of a subject. As a result, the lens can reach a focal point irrespective of a color of a subject with high luminance accurately.

The ratio between the number of pixels in a light portion and the number of pixels in a dark portion is used to determine whether to switch the AF operations for the following reasons.

A conveyable way to detect a subject with high luminance in an image is to control switching AF operations based on the low-frequency evaluation data to AF operations based on the high-frequency evaluation data while considering only the number of pixels in a light portion, not the number of pixels in a dark portion. However, this case involves the following problem.

For example, in the case of photographing a white wall as a subject in the daylight, an image including a bright subject in an entire region is generated. If the AF operation control is switched only based on the number of pixels in a light portion, AF operations are performed for such an image based on the high-frequency evaluation data. However, an image that is originally bright in an entire region rarely causes a pseudo peak in low-frequency data, which is a problem to be solved by the embodiment. Hence, general AF operations can be performed for such an image, and it is unnecessary to switch the AF operations based on the high-frequency evaluation data as in this embodiment. Rather, if the unnecessary AF operations are performed based on the high-frequency evaluation data, a problem of increasing the time up to the completion of the AF operations occurs.

Here, a pseudo peak of low-frequency data that is a problem to be solved by this embodiment is more likely to appear in a dark image partially including a subject with high luminance. To that end, it is preferably to apply the AF operations of this embodiment only to a dark image that partially includes a subject with high luminance, dumping an entirely bright image. Thus, in this embodiment, the ratio of a bright image area to a dark image area (a ratio of the number of pixels in a dark portion) is taken into consideration. In other words, if the ratio of the number of pixels in a bright portion to the number of pixels in a dark portion is a predetermined value or less, it is determined that a taken image is entirely a dark image that partially includes a subject with high luminance.

To that end, according to this embodiment, it is determined as to an image that might cause a pseudo peak in the low-frequency evaluation data among the images including a subject with high luminance by using the ratio of the number of pixels in a bright portion to the number of pixels in a dark portion, and then, AF operations are performed only for an image that might cause a pseudo peak based on the high-frequency evaluation data.

Here, the smear detection of the first embodiment is applicable to only a CCD as an imaging device. However, the detection of the pixel number ratio of the second embodiment is applicable to any imaging device other than the CCD.

Third Embodiment

Hereinafter, a third embodiment will be described with reference to FIGS. 5 and 6.

The configuration of the third embodiment includes the smear detecting unit of the first embodiment and both of the light portion pixel counter and dark portion pixel counter of the second embodiment. That is, the configuration of the third embodiment is such that the smear detecting unit is added to the configuration of the second embodiment or the light portion pixel counter and dark portion pixel counter of the second embodiment are added to the configuration of the first embodiment.

1. Configuration

Figure 5:
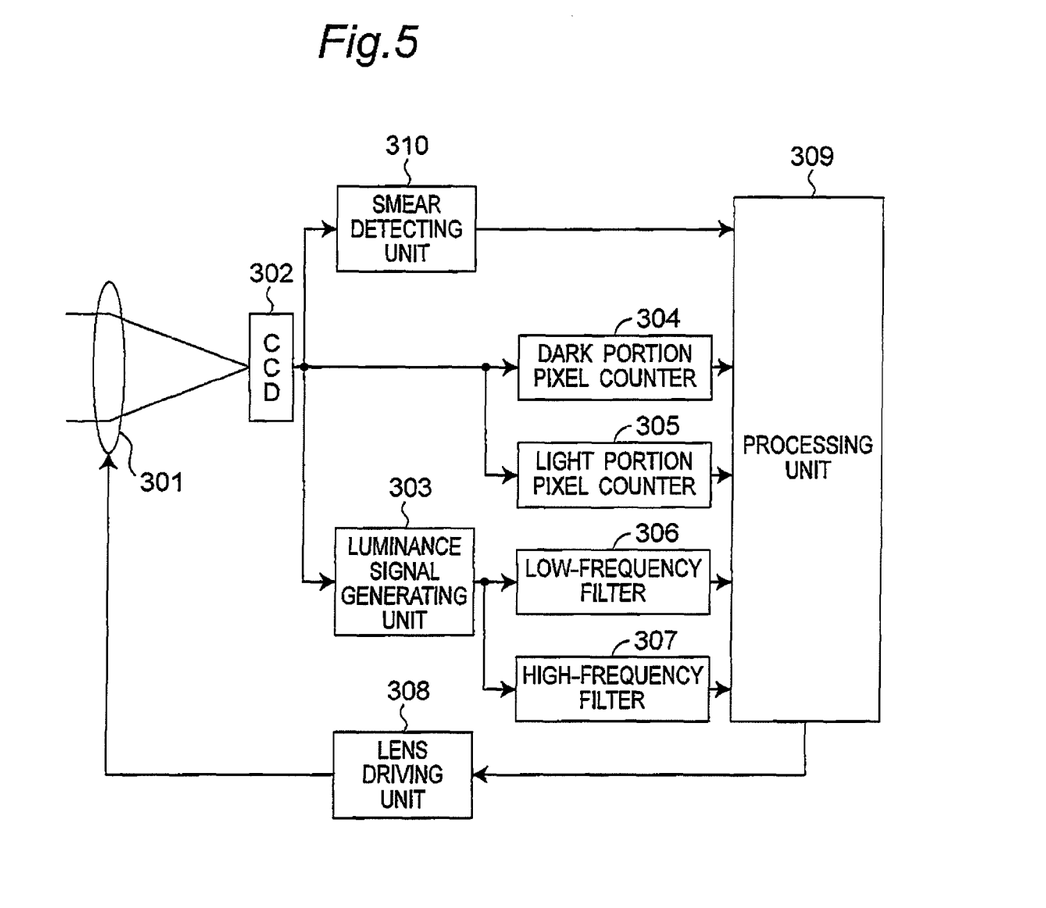
FIG. 5 is a block diagram of an imaging apparatus according to a third embodiment.

As shown in FIG. 5, an imaging apparatus includes a focus lens 301, a CCD 302, a luminance signal generating unit 303, a dark portion pixel counter 304, a light portion pixel counter 305, a low-frequency filter 306, a high-frequency filter 307, a lens driving unit 308, and a processing unit 309. The focus lens 301 adjusts the focus. The CCD 302 converts an input optical image into electric signals. The luminance signal generating unit 303 generates a luminance signal using an electric signal (video signal) output from the CCD 302. The dark portion pixel counter 304 counts the pixels in a dark portion based on an electric signal output from the CCD 302. The light portion pixel counter 305 counts the pixels in a light portion based on an electric signal output from the CCD 302. A smear detecting unit 310 detects smear in an image based on an electric signal output from the CCD. The low-frequency filter 306 passes low-frequency components of the luminance signal output from the luminance signal generating unit 303, each of which has a frequency not higher than a predetermined frequency. The low-frequency filter 306 generates low-frequency evaluation data based on the luminance signal output from the luminance signal generating unit 303. The high-frequency filter 307 passes high-frequency components of the luminance signal output from the luminance signal generating unit 303, each of which has a frequency not lower than a predetermined frequency. The high-frequency filter 306 generates high-frequency evaluation data based on the luminance signal output from the luminance signal generating unit 303. The lens driving unit 308 drives the focus lens 301 along an optical axis direction. The processing unit 309 calculates a ratio between the number of pixels in a light portion and the number of pixels in a dark portion in all RGB colors (a ratio of the number of pixels in a light portion to the number of pixels in a dark portion), and compares the ratio with a predetermined value to control the lens driving unit 308 based on the comparison result and the smear detection result of the smear detecting unit 310 by utilizing low-frequency evaluation data or high-frequency evaluation data to thereby control the AF operation.

Here, the dark portion pixel counter 304 and the light portion pixel counter 305 are provided for each of primary color electric signals R, G, and B output from the CCD 302. The dark portion pixel counter 304 counts the pixels of which signal levels are at a predetermined level or less in each of RGB colors of an electric signal output from the CCD 302 to obtain the number of pixels in a dark portion. The light portion pixel counter 305 counts the pixels of which signal levels are at a predetermined level or more (larger than the predetermined level for the dark portion) in each of RGB colors of an electric signal output from the CCD 302 to obtain the number of pixels in a light portion.

Here, the predetermined level of the signal level in the light portion pixel counter 305 and the predetermined level of the signal level in the dark portion pixel counter 304 may be arbitrarily set in accordance with conceivable brightness or color of a subject with high luminance for each of RGB colors. Further, a predetermined value for the ratio between the number of pixels in a light portion and the number of pixels in a dark portion (a ratio of the number of pixels in a light portion to the number of pixels in a dark portion) may be arbitrarily set for each of RGB colors.

2. Operation

Figure 6:
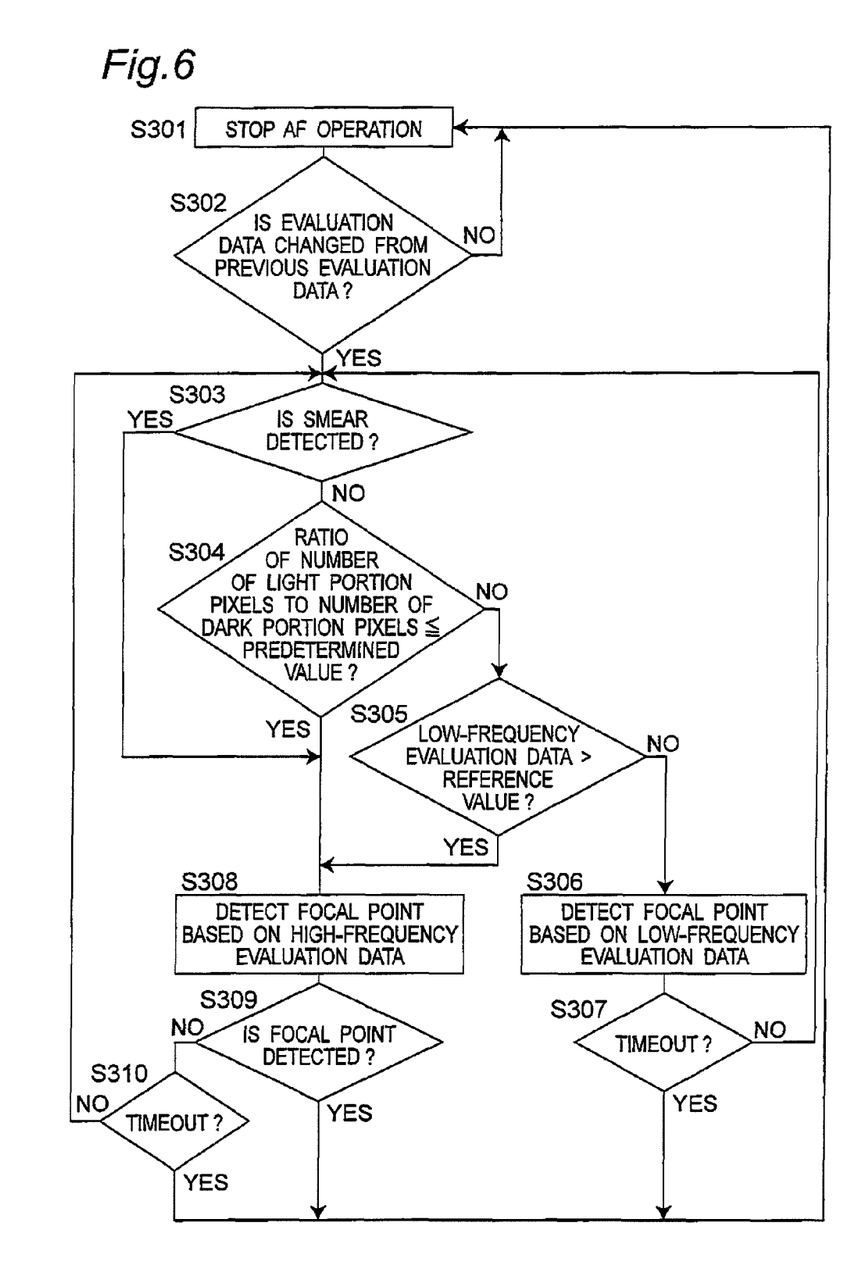
FIG. 6 is a flowchart of operations of the third embodiment.

Referring next to FIG. 6, operations of the imaging apparatus are described. Here, similar operations to the first embodiment are omitted. The CCD 302 converts an optical image input through the focus lens 301 into electric signals for each of RGB pixels. The dark portion pixel counter 304 and the light portion pixel counter 305 counts the pixels in a dark portion and light portion for each of RGB colors out of the pixels of a taken image. The luminance signal generating unit 303 generates a luminance signal. The low-frequency filter 306 and the high-frequency filter 307 generate AF evaluation data based on the luminance signal. The processing unit 309 compares previous evaluation data (previous imaging device driving period) with current evaluation data. If any change is detected, processing unit 309 determines that an image being captured is changed and start AF operations (S302).

In the state in which the AF operation stops (S301), if an optical image is input to the CCD 302 through the focus lens 301, the CCD 302 converts the optical image into primary color electric signals R, G, and B. The smear detecting unit 303 detects the occurrence of smear (S303). If no smear is detected, the processing unit 309 refers the count results from the dark portion pixel counter 304 and the light portion pixel counter 305 (S304). As a result, if the ratio between the number of pixels in a light portion and the number of pixels in a dark portion in all primary color electric signals R, G, and B (a ratio of the number of pixels in a light portion to the number of pixels in a dark portion) is not a predetermined value or less (NO in S304), it is determined that a taken image is an image with general brightness and there is no influence of a subject with high luminance on focusing. Then, similarly to the conventional techniques, the AF operations are performed based on low-frequency evaluation data (S306), and afterward the AF operations are performed based on the high-frequency evaluation data (S308).

On the other hand, if smear is detected in step S303, or if the ratio between the number of pixels in a light portion and the number of pixels in a dark portion in at least one of primary color electric signals R, G, and B (a ratio of the number of pixels in a light portion to the number of pixels in a dark portion) is a predetermined value or less in step S304, that is, if smear appears, or if a taken image is a dark image with a subject with high luminance, it is determined that there is an influences of the subject with high luminance on focusing (YES in step S304). Then, AF operations are immediately performed based on the high-frequency evaluation data (S308) instead of performed AF operations based on the low-frequency evaluation data.

More specifically, the processing unit 309 controls the lens driving unit 308 based on the high-frequency evaluation data generated by the high-frequency filter 307 and moves the focus lens 301 in an optical axis direction (S308). If the resultant high-frequency evaluation data obtained through the movement is the reference value or more, the processing unit 309 determines that the lens comes into focus (YES in S309) and stops AF operations (S301). On the other hand, if the evaluation data is the reference value or less, the processing unit 309 determines that the lens is out of focus (NO in S309) and further moves the focus lens 301 (S308). If the evaluation data becomes the reference value or less even after the operation in step S308 is repeated for a predetermined time, the processing unit 309 determines that the lens cannot come into focus (YES in step S310) and stops the AF operations.

As described above, according to the present invention, if it is determined that smear is detected or the ratio between the number of pixels in a light portion and the number of pixels in a dark portion (a ratio of the number of pixels in a light portion to the number of pixels in a dark portion) is a predetermined value or less, AF operations are performed only based on the high-frequency evaluation data without performed AF operations based on the low-frequency evaluation data. As a result, in the case of capturing a dark image including a subject with high luminance, such a problem that a false focal point is detected through the AF operations based on low-frequency evaluation data can be avoided. That is, a correct focal point can be detected, and the focus lens can be moved to a correct position. Further, in the case of capturing an image with general brightness, as in the conventional configuration, the lens can reach a focal point quickly and accurately. Particularly, in this embodiment, since the ratio between the number of pixels in a light portion and the number of pixels in a dark portion is calculated in each of RGB colors of a taken image and determined, the count result does not depend on a color of a subject. In addition, at the time of detecting smear as well, smear is detected in each of RGB colors, so the smear detection result does not depend on a color of a subject. As a result, the lens can reach a focal point irrespective of a color of a subject with high luminance accurately.

INDUSTRIAL APPLICABILITY

According to the imaging apparatus of the embodiments, it is possible to provide an imaging apparatus with AF control which can focus on an intended subject even if a taken image includes a subject with high luminance, and this apparatus is widely applicable to video cameras with AF control and the like.

The above description is described for to particular embodiments, but those skilled in the art could understand that other modified examples, adjustments, and applications are encompassed. The embodiments are not limited to particular ones described herein and only limited by the attached scope of claims.

What is claimed is:

1. An imaging apparatus comprising:
a focus lens for adjusting focus;
an imaging device operable to convert an optical image input through the focus lens into electric signals in each of RGB colors;
a luminance signal generator operable to generate a luminance signal based on the electric signal output from the imaging device;
a low-frequency filter operable to weaken signal components of the luminance signal output from the luminance signal generator, each of which has a frequency equal to or higher than a predetermined frequency;
a high-frequency filter operable to weaken signal components of the luminance signal output from the luminance signal generator, each of which has a frequency equal to or lower than a predetermined frequency;
a determiner operable to determine whether focusing is influenced by a subject with high luminance based on a signal level of each of RGB colors;
a processor operable to detect a focal point based on an output of the high-frequency filter when the determiner determines that focusing is influenced by the subject with high luminance, and to detect a focal point based on an output of the low-frequency filter and then detect a focal point based on an output of the high-frequency filter when the determiner determines that focusing is not influenced by the subject with high luminance;
a dark portion pixel counter operable to count the pixels of which brightness is equal to or darker than a predetermined brightness in each of RGB colors; and
a light portion pixel counter operable to count the pixels of which brightness is equal to or brighter than a predetermined brightness in each of RGB colors,
wherein the determiner determines that focusing is influenced by the subject with high luminance when a ratio of a count by the light portion pixel counter to a count by the dark portion pixel counter is equal to or less than a predetermined value in at least one of RGB colors, and determines that focusing is not influenced by the subject with high luminance when a ratio of the count by the light portion pixel counter to the count by the dark portion pixel counter is larger than the predetermined value.

2. The imaging apparatus according to claim 1, further comprising:
a smear detector operable to detect occurrence of smear in an image captured with the imaging device,
wherein the determiner determines that focusing is influenced by the subject with high luminance, when the smear detector detects an occurrence of smear.

3. The imaging apparatus according to claim 2, wherein the smear detector detects whether a signal level in each of RGB colors is equal to or higher than a predetermined level, and
the determiner determines that focusing is influenced by the subject with high luminance when the smear detector detects that a signal level in at least one of RGB colors is equal to or higher than a predetermined level.

4. The imaging apparatus according to claim 3, wherein the predetermined level can be set for each of RGB colors.

5. The imaging apparatus according to claim 1, wherein the predetermined brightness can be set for each of RGB colors.

* * * * *